US006611859B1

(12) United States Patent
Kohno

(10) Patent No.: US 6,611,859 B1
(45) Date of Patent: Aug. 26, 2003

(54) ADDRESS SETTING METHOD, CLIENT APPARATUS, SERVER APPARATUS AND CLIENT-SERVER SYSTEM

(75) Inventor: Ryuji Kohno, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/513,794

(22) Filed: Feb. 25, 2000

(30) Foreign Application Priority Data

Mar. 8, 1999 (JP) .......................................... P11-060926

(51) Int. Cl.[7] .............................. G06F 15/16; H04B 3/20
(52) U.S. Cl. ........................ 709/203; 709/250; 370/286
(58) Field of Search ................................ 709/227, 203, 709/245, 228, 221, 217, 231, 250; 710/107; 370/338, 286

(56) References Cited

U.S. PATENT DOCUMENTS

| 4,652,874 A | 3/1987 | Loyer ..................... 340/825.05 |
| 4,723,120 A | 2/1988 | Petty, Jr. ................. 340/825.02 |

(List continued on next page.)

FOREIGN PATENT DOCUMENTS

| DE | 31 51 492 A1 | 7/1983 | ............. H04N/5/44 |
| EP | 0 371 719 A2 | 6/1990 | ............. H04B/1/20 |
| EP | 0 573 204 A2 | 12/1993 | ............. H04L/12/40 |
| EP | 0 626 635 A2 | 11/1994 | ............. G06F/3/00 |
| EP | 0 637 157 A2 | 2/1995 | ............. H04L/29/06 |
| EP | 0 727 729 A1 | 8/1996 | ............. G06F/1/32 |
| JP | 4-97468 | 3/1992 | ............. G06F/13/14 |
| JP | 7-134628 | 5/1995 | ............. G06F/1/32 |
| WO | WO 96/07971 | 3/1996 | ............. G06F/13/38 |

OTHER PUBLICATIONS

IEEE Standard for a High Performance Serial Bus, IEEE STD. 1394–1995, Aug. 30, 1996.
A. Gefrides et al., "Standard Bus Connects Up to 126 Peripherals: Plug and Play with USB," Communications XXXI (1996), May 1996, pp. 36–38.
G. Hoffman et al., "IEEE 1394: A Ubiquitous Bus," IEEE May 3, 1995, pp. 334–338.
D. Bursky, "Networking Scheme Exploits Existing RS–232 Interface," Electronic Design, vol. 35, No. 13, May 1987., pp. 65–68.

*Primary Examiner*—David Wiley
*Assistant Examiner*—Michael Delgado
(74) *Attorney, Agent, or Firm*—Bell, Boyd & Lloyd, LLC

(57) ABSTRACT

A network comprises an IEEE 1394 sub-network serving as a wire-communication system at the high-level layer, and a plurality of radio-communication terminals (radio-communication nodes) which form DHCP clients. The IEEE 1394 sub-network constitutes an in-home LAN (Local Network Area). The IEEE 1394 sub-network includes antenna base stations each serving as a DHCP server. The antenna base stations have a pool comprising a predetermined number of addresses which are assigned automatically to radio-communication terminals (or DHCP clients) in a cell under control by each of the antenna base stations. In this case, the addresses in the pool controlled by the antenna base stations (DHCP servers) are varied among the servers according to a dynamic mobility distribution of radio-communication terminals. In this way, addresses can be utilized efficiently and, at the same time, it is possible to avoid a bus reset caused by a movement of a radio-communication terminal.

8 Claims, 10 Drawing Sheets

U.S. PATENT DOCUMENTS

| | | | |
|---|---|---|---|
| 4,903,016 A | 2/1990 | Murai et al. | 340/825.07 |
| 5,007,051 A | 4/1991 | Dolkas et al. | 370/85.1 |
| 5,400,246 A | 3/1995 | Wilson et al. | 364/146 |
| 5,418,527 A | 5/1995 | Yashiro | 340/825.24 |
| 5,420,724 A | 5/1995 | Kawamura et al. | 360/13 |
| 5,455,569 A | 10/1995 | Sherman et al. | 340/825.02 |
| 5,475,835 A | 12/1995 | Hickey | 395/600 |
| 5,481,750 A | 1/1996 | Parise et al. | 395/800 |
| 5,515,211 A | 5/1996 | Kawamura | 360/14.2 |
| 5,537,605 A | 7/1996 | Teece | 395/800 |
| 5,539,390 A | 7/1996 | Nagano et al. | 340/825.07 |
| 5,657,221 A | 8/1997 | Warman et al. | 364/188 |
| 5,687,334 A | 11/1997 | Davis et al. | 395/339 |
| 5,712,834 A | 1/1998 | Nagano et al. | 369/19 |
| 5,729,717 A | 3/1998 | Tamada et al. | 395/491 |
| 5,778,064 A | 7/1998 | Kori et al. | 380/5 |
| 5,787,259 A | 7/1998 | Haroun et al. | 395/200.83 |
| 5,790,876 A | 8/1998 | Shima et al. | 397/750.03 |
| 5,793,366 A | 8/1998 | Mano et al. | 345/329 |
| 5,815,631 A | 9/1998 | Sugiyama et al. | 386/46 |
| 5,847,771 A | 12/1998 | Cloutier et al. | 348/564 |
| 5,850,573 A | 12/1998 | Wada | 395/882 |
| 5,875,108 A | 2/1999 | Hoffberg et al. | 364/146 |
| 5,887,193 A | 3/1999 | Takahashi et al. | 395/828 |
| 5,963,450 A | 10/1999 | Dew | 364/474.11 |
| 5,973,748 A | 10/1999 | Horiguchi et al. | 348/554 |
| 5,987,126 A | 11/1999 | Okuyama et al. | 380/5 |
| 6,038,609 A * | 3/2000 | Geulen | 709/250 |
| 6,078,566 A * | 6/2000 | Kikinis | 370/286 |
| 6,094,674 A * | 7/2000 | Hattori et al. | 709/203 |
| 6,178,455 B1 * | 1/2001 | Schutte et al. | 709/228 |
| 6,286,039 B1 * | 9/2001 | Van Horne et al. | 709/221 |
| 6,377,996 B1 * | 4/2002 | Lumelsky et al. | 709/231 |
| 6,421,714 B1 * | 7/2002 | Rai et al. | 709/217 |
| 6,427,174 B1 * | 7/2002 | Sitaraman et al. | 709/245 |

* cited by examiner

FIG. 8

| | |
|---|---|
| NUMBER OF BUSES | 1 |
| NUMBER OF BASE STATIONS | 6 |
| NUMBER OF WIRE-COMMUNICATION NODES (INCLUDING BASE STATIONS) | 10 |
| NUMBER OF ALL RADIO-COMMUNICATION NODES | 0 TO 100 |
| NUMBER OF CONNECTED RADIO-COMMUNICATION NODES | 0 TO 53 |
| TRANSFER SPEED (BOTH RADIO AND WIRE COMMUNICATIONS) | 100 Mbps |
| CONFIGURATION PACKET | 64 bits |
| SELF ID PACKET | 64 bits |
| ACTIVATION OF CLIENTS | POISSON'S DISTRIBUTION |
| NUMBER OF EXECUTIONS | 10,000 TIMES |

FIG. 11A

| | NUMBER OF BUS-RESETS (TIMES) |
|---|---|
| CONVENTIONAL SYSTEM | 139.45 |
| FIXED SYSTEM | 15.92 |
| PROPOSED SYSTEM 1 | 14.13 |
| PROPOSED SYSTEM 2 | 16.47 |

(BEFORE ADDRESS SATURATION)

FIG. 11B

| | NUMBER OF BUS-RESETS (TIMES) |
|---|---|
| CONVENTIONAL SYSTEM | 137.27 |
| FIXED SYSTEM | 61.19 |
| PROPOSED SYSTEM 1 | 72.51 |
| PROPOSED SYSTEM 2 | 48.70 |

(AFTER ADDRESS SATURATION)

FIG. 11C

| | NUMBER OF BUS-RESETS (TIMES) |
|---|---|
| CONVENTIONAL SYSTEM | 276.72 |
| FIXED SYSTEM | 77.11 |
| PROPOSED SYSTEM 1 | 86.64 |
| PROPOSED SYSTEM 2 | 65.17 |

(OVERALL)

ADDRESS SETTING METHOD, CLIENT APPARATUS, SERVER APPARATUS AND CLIENT-SERVER SYSTEM

BACKGROUND OF THE INVENTION

The present invention relates to an address setting method, a client apparatus, a server apparatus and a client-server system which are suitably applicable to for example a wireless 1394 network system. More particularly, the present invention relates to an address setting method or the like whereby an address can be added or changed to keep up with a variation in state of connection occurring in a radio-communication unit of typically a wireless 1394 network entirely by introduction of a DHCP (Dynamic Host Configuration Protocol) into the radio unit so that the number of bus-resets in the entire network can be reduced.

As a multimedia interface for linking the digital AV (Audio-Video) world to the PC (Personal Computer) world, a IEEE 1394 bus draws attention. The IEEE 1394 bus is a high-speed bus having a transmission speed of at least several hundreds of Mbps. The IEEE 1394 bus has both transmission functions, namely, an isochronous transfer function for transferring continuous data such as moving-picture information and an asynchronous transfer function for transferring burst data as in the ordinary data communication. In addition, a variety of industries such as the AV world, the PC world and the broadcasting world adopt the IEEE 1394 bus as media for transmitting digital information at homes. This is because the IEEE 1394 bus offers a user-friendly way of using. To be more specific, the IEEE 1394 bus provides media which not only have a high performance but also meet plug-and-play requirements, with which hot-plug-in is possible, of which connectors and cables are easy to handle with.

Along the trend observed in the industries as described above, research of a wireless 1394 system is under way. The wireless 1394 system is a radio version of the IEEE 1394 bus. Even in a wire-communication system, a bus-reset due to a change in connection state raises a problem of an interrupted isochronous communication and, hence, a deteriorating quality. However, migration to a radio-communication system which offers good mobility and a high degree of freedom will cause the state of network connection to change frequently. Thus, the number of bus-resets is expected to increase accordingly. As a result, a bigger problem is conceivably raised.

SUMMARY OF THE INVENTION

It is thus an object of the present invention to provide an address setting method or the like which is capable of reducing the number of bus-resets in the whole network.

An address setting method provided by the present invention is an address setting method adopted in a client-server system to assign a network address to a radio-communication terminal wherein: a client executes the steps of: creating a priority-order assignment table of servers in accordance with a control signal received from at least one of the servers; selecting a server as close to the top one of the priority-assignment table as possible as a connection server and outputting a request for a connection to the connection server; establishing a connection with the connection server based on the reception of the request by the connection server; and requesting a connectable server to increase and set the number of addresses in case a settable address of the connectable server does not exist in an address pool, and a server executes the steps of: establishing a connection with a client by setting a settable address for the client in response to the client's request for the connection for which the settable address exists in a pool of addresses; and issuing a request for redistribution of addresses in the pool to all servers in response to a client's request to increase and set the number of addresses to which an address available in any of the servers can be allocated.

In addition, the present invention also provides an address setting method to be adopted in a client-server system to assign a network address to a radio-communication terminal wherein: a client executes the steps of: creating a priority-order assignment table of servers in accordance with a control signal received from at least one of the servers; periodically transmitting current contents of the priority-order assignment table to a presently connected first server; and establishing a new connection with a second server upon reception of a notice of establishment of the new connection from the second server and informing the first server of an end of an existing connection with the first server, the servers execute the steps of: forming a judgment as to whether or not a second server having a higher priority than a first server exists upon reception of a priority-assignment table from a client by the first server; setting an address for the client and establishing a connection with the client by the second server if an available address exists in the second server; and issuing a request for redistribution of addresses in the pool to all servers in response to a client's request to increase and set the number of addresses to which an address available in any of the servers can be allocated.

Furthermore, the present invention also provides a client apparatus to be employed in a client-server system for assigning a network address to a radio-communication terminal, the client apparatus comprising: a table creation means: for creating a priority-order assignment table of servers in accordance with a control signal received from at least one of the servers; a server selection means for selecting a server as close to the top one of the priority-assignment table as possible as a connection server and outputting a request for a connection to the connection server; a connection establishing means for establishing a connection with the connection server based on the reception of the request by the connection server; and an address redistribution means for requesting a connectable server to increase and set the number of addresses in case a settable address of the connectable server does not exist in an address pool.

Moreover, the present invention also provides a server apparatus to be employed in a client-server system for assigning a network address to a radio-communication terminal, the server apparatus comprising: a connection establishing means for establishing a connection with a client by setting a settable address for the client in response to the client's request for the connection for which the settable address exists in a pool of addresses; and an address redistribution means for issuing a request for redistribution of addresses in the pool to all servers in response to a client's request to increase and set the number of addresses to which an address available in any of the servers can be allocated.

On the top of that, the present invention also provides a client apparatus to be employed in a client-server system for assigning a network address to a radio-communication terminal, the client apparatus comprising: a table creation means for creating a priority-order assignment table of servers in accordance with a control signal received from at least one of the servers; a table transmission means for periodically transmitting current contents of the priority-order assignment table to a presently connected first server;

and a connection establishing means for establishing a new connection with a second server upon reception of a notice of establishment of the new connection from the second server and informing the first server of an end of an existing connection with the first server.

In addition, the present invention also provides a server apparatus to be employed in a client-server system for assigning a network address to a radio-communication terminal, the server apparatus comprising: a priority judgment means for forming a judgment as to whether or not a second server having a higher priority than a first server exists upon reception of a priority-assignment table from a client by the first server; a connection establishing means for setting an address for the client and establishing a connection with the client by the second server if an available address exists in the second server; and an address redistribution means for issuing a request for redistribution of addresses in the pool to all servers in response to a client's request to increase and set the number of addresses to which an address available in any of the servers can be allocated.

Moreover, the present invention also provides a client-server system for assigning a network address to a radio-communication terminal wherein: a client comprises: a table creation means for creating a priority-order assignment table of servers in accordance with a control signal received from at least one of the servers; a server selection means for selecting a server as close to the top one of the priority-assignment table as possible as a connection server and outputting a request for a connection to the connection server; a connection establishing means for establishing a connection with the connection server based on the reception of the request by the connection server; and an address redistribution means for requesting a connectable server to increase and set the number of addresses in case a settable address of the connectable server does not exist in an address pool, and a server comprises: a connection establishing means for establishing a connection with a client by setting a settable address for the client in response to the client's request for the connection for which the settable address exists in a pool of addresses; and an address redistribution means for issuing a request for redistribution of addresses in the pool to all servers in response to a client's request to increase and set the number of addresses to which an address available in any of the servers can be allocated.

Furthermore, the present invention also provides a client-server system for assigning a network address to a radio-communication terminal wherein: a client comprises: a table creation means for creating a priority-order assignment table of servers in accordance with a control signal received from at least one of the servers; a table transmission means for periodically transmitting current contents of the priority-order assignment table to a presently connected first server; and a connection establishing means for establishing a new connection with a second server upon reception of a notice of establishment of the new connection from the second server and informing the first server of an end of an existing connection with the first server; and servers each comprise: a priority judgment means for forming a judgment as to whether or not a second server having a higher priority than a first server exists upon reception of a priority-assignment table from a client by the first server; a connection establishing means for setting an address for the client and establishing a connection with the client by the second server if an available address exists in the second server; and an address redistribution means for issuing a request for redistribution of addresses in the pool to all servers in response to a client's request to increase and set the number of addresses to which an address available in any of the servers can be allocated.

In the present invention, a DHCP is introduced into typically a radio-communication portion of the wireless 1394 network. The DHCP is a protocol adopted in a system comprising a DHCP server and a plurality of DHCP clients wherein a fixed number of IP addresses in a pool of the DHCP server are automatically assigned to the DHCP clients. By adopting the DHCP in a radio-communication portion of a leaf in a network, an address is set for a movement of a client in this portion in accordance with the DHCP. That is to say, a radio-communication portion of a network where the state of connection changes greatly and frequently is virtually detached from a high-level layer which forms a wire-communication portion of the network. In this way, the high-level layer is protected and, as a result, the number of bus-resets in the entire system can be reduced.

In addition, the number of pool addresses allocated to each DHCP server is changed adaptively to dynamic mobility distribution of clients in order to allow addresses to be effectively utilized and the number of bus-resets to be reduced.

BRIEF DESCRIPTION OF THE DRAWINGS

FIG. 8 is a table showing parameters used in computer simulation to compute a deterioration-ratio characteristic and a bus-reset characteristic;

FIGS. 11A to 11C are tables each showing a total number of bus-resets before and after address saturation.

DETAILED DESCRIPTION OF THE PREFERRED EMBODIMENT

The present invention will become more apparent from a study of: the following detailed description of a preferred embodiment with reference to the diagrams.

As a wireless 1394 model, it is desirable to eventually replace all elements connected in the contemporary wire-communication system by radio-communication elements. A communication speed of at least 100 Mbps is set as a target. In one application, however, a communication of merely several tens of Mbps is considered to be required to the most. In addition, as a connection method, conversion of only leaf portions of a network into radio-communication elements is conceived to be practical. For the reason described above, in this embodiment, we think of a model wherein only leaf portions of a network go radio.

In this case, basically, a mechanism is introduced into each leaf portion of the network of the 1394 wireless system. The introduced mechanism is similar to a mechanism of setting an IP address of the DHCP of the TCP/IP (Transmission Control Protocol/Internet Protocol) system. When the environment moves from the TCP/IP system to the wireless 1394 system, the transmission medium changes from a wire-communication-system medium to a radio-communication-system medium. In order to connect a host by a radio means, an antenna base station is indispensable. The thing that moves frequently is a radio-communication node connected to this antenna base station. For this reason, the antenna base station is provided with the function of a DHCP server whereas the radio-communication terminal is provided with the function of a DHCP client.

That is to say, in a wire-communication system at a high-level layer, an address setting mode centered on the conventional bus-reset is adopted. In a radio-communication system at a low-level layer, on the other hand, the DHCP is adopted only for address setting. By virtually separating the radio-communication system and the wire-communication system from each other in this way, it is possible to suppress an effect of the radio-communication system with violent variations in network connection state.

Figure 1:
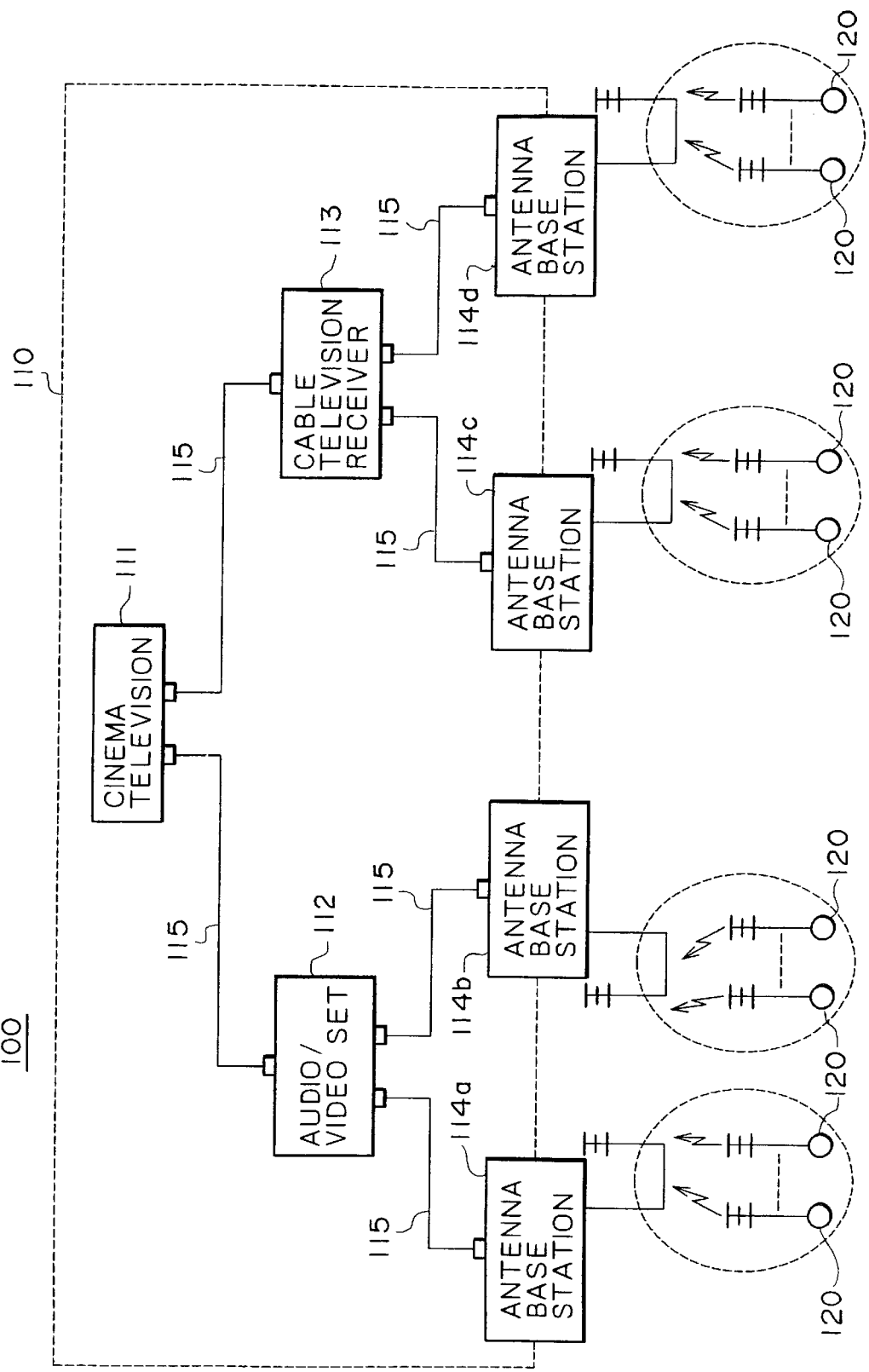
FIG. 1 is a diagram showing the configuration of a wireless 1394 network provided by the embodiment.

FIG. 1 is a diagram showing the configuration of a wireless 1394 network 100 provided by the embodiment. The wireless 1394 network 100 comprises an IEEE 1394 sub-network 110 serving as a wire-communication system at the high-level layer, and a plurality of radio-communication terminals (radio-communication nodes) 120 which form DHCP clients.

The IEEE 1394 sub-network 110 constitutes an in-home LAN (Local Network Area). The IEEE 1394 sub-network 110 comprises IEEE 1394 nodes including a cinema television 111, an audio/video set 112, a cable television receiver 113 and antenna base stations 114a to 114d each serving as a DHCP server. In the IEEE 1394 sub-network 110, the cinema television 111, the audio/video set 112 and the cable television receiver 113 are connected to each other by IEEE 1394 buses 115. By the same token, the audio/video set 112 is connected to the antenna base station 114a and 114b by IEEE 1394 buses 115. Likewise, the cable television receiver 113 is connected to the antenna base station 114c and 114d by IEEE 1394 buses 115.

The antenna base stations 114a to 114d, which each serve as a DHCP server, have a pool comprising a predetermined number of addresses which are assigned automatically to radio-communication terminals (or DHCP clients) 120 in a cell under control by each of the antenna base stations 114a to 114d. In this case, the addresses in the pool controlled by the antenna base stations (DHCP servers) 114a to 114d are distributed among the servers adaptively to a dynamic mobility distribution of radio-communication terminals (DHCP clients) 120. In this way, addresses can be utilized efficiently and, at the same time, it is possible to avoid a bus-reset caused by a movement of a radio-communication terminal 120.

Figure 2:
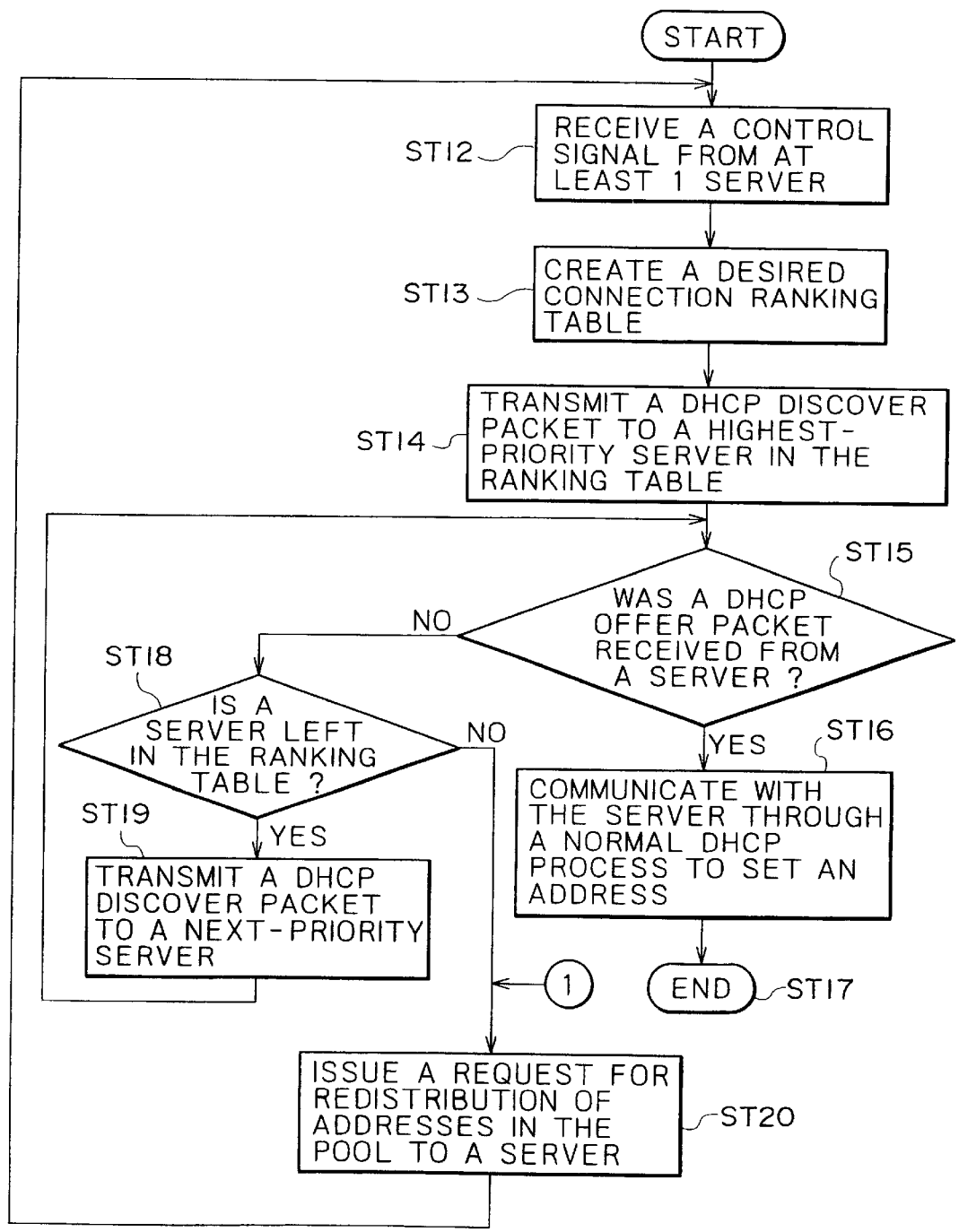
FIG. 2 is a flowchart representing the operation of a newly connected client.
Figure 3:
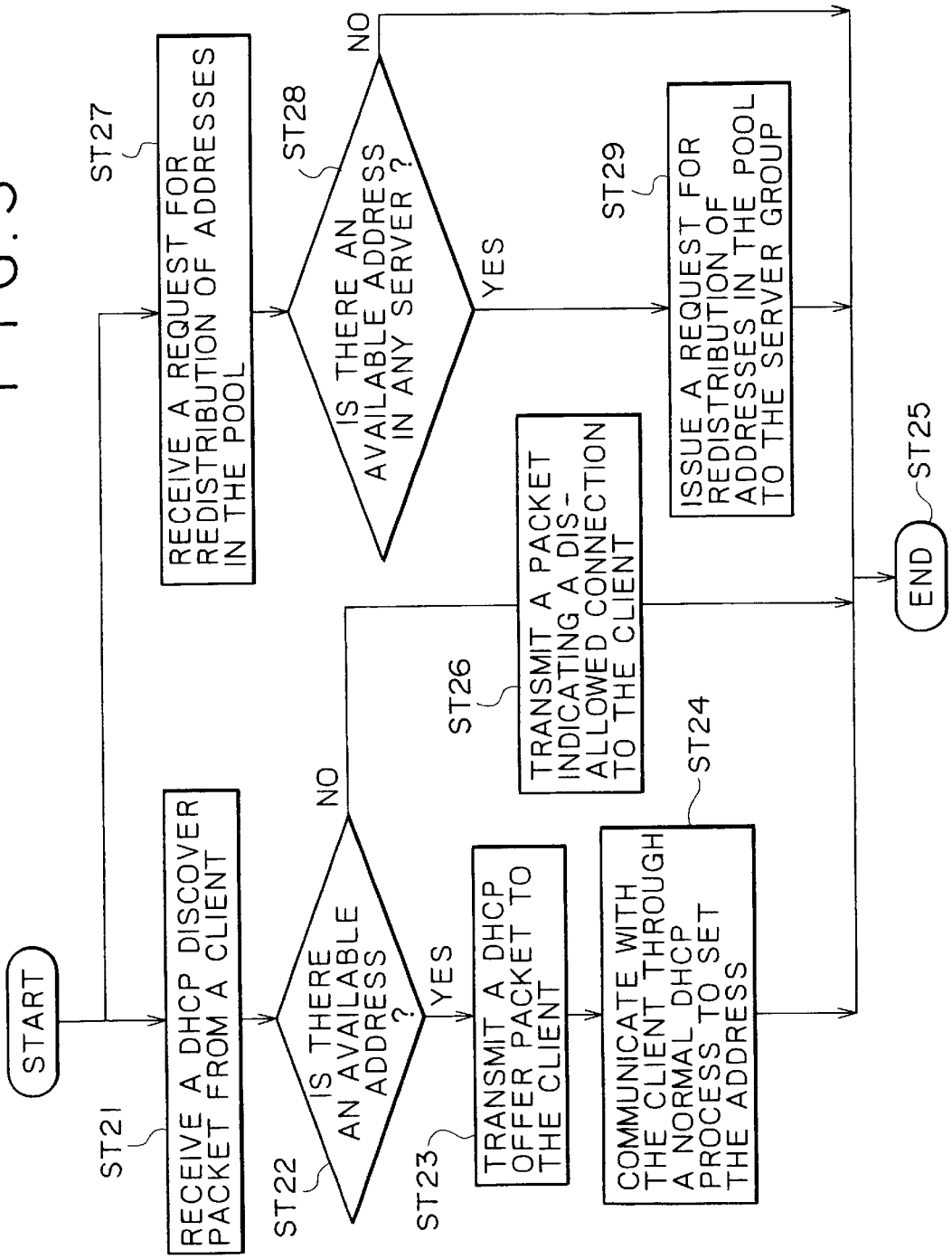
FIG. 3 is a flowchart representing the operation of a server for a newly connected client.

The following description explains the operation of a newly connected DHCP client (or a radio-communication terminal) and the operation of a DHCP server (or an antenna base station) for such a client with reference to flowcharts shown in FIGS. 2 and 3 respectively.

First of all, the operation of a newly connected DHCP client (or a radio-communication terminal) is explained. As shown in FIG. 2, the flowchart begins with a step ST12 at which a control signal is received from at least one of the servers. Subsequently, at a step ST13, a desired connection ranking table is created. In this case, the client observes the reception level of the control signal received from the server to obtain a desired connection ranking based on an observed value of the reception level of the control signal. It should be noted, however, that a reception level not exceeding a reference value is not included in the ranking. Here, a reference value means a level under which a good quality can not be assured.

Then, at a step ST14, a DHCP discover packet is transmitted to the first-ranked server in the ranking table to make a request for a connection. Subsequently, at a step ST15, the client forms a judgment as to whether or not a DHCP offer packet was received from the server. If a DHCP offer packet was received from the server, the flow of the operation goes on to a step ST16 at which a communication with the server in accordance with an ordinary DHCP process is carried out and an address is set. The operation is finished at the next step ST17. If a DHCP offer packet was not received from the server, on the other hand, the flow of the operation goes on to a step ST18.

At the step ST18, the client forms a judgment as to whether or not a next-ranked server remains in the table. If a next-ranked server exists in the table, the flow of the operation goes on to a step ST19 at which a DHCP discover packet is transmitted to the next-ranked server to make a request for a connection. Then, the flow of the operation goes back to the step ST15 to repeat the same processing described above. If a next-ranked server does not exist in the table, on the other hand, the flow of the operation goes on to a step ST20 to request the server to redistribute addresses in the pool among the servers. In actuality, the client may issue this request to all the servers or only a specific server. Then, the flow of the operation goes back to the step ST12 to repeat the processing described above.

Next, the operation of the DHCP server (or the antenna base station) for a newly connected client is explained. As shown in FIG. 3, the flowchart begins with a step ST21 at which a DHCP discover packet is received from a client. Then, at a step ST22, the server forms a judgment as to whether or not there is an available address. If there is an available address, the flow of the operation goes on to a step ST23 at which the server transmits a DHCP offer packet to the client. Then, at a step ST24, the server carries out a communication with the client through an ordinary DHCP process to set an address. Finally, at a step ST25, the operation is finished. If there is no available address, on the other hand, the flow of the operation goes on from the step ST22 to a step ST26 at which the server transmits a packet notifying the client that there is no available address. Also in this case, the operation is finished at the step ST25.

The operation may also start with a step ST27 at which the server receives a packet requesting that addresses in the pool be redistributed to the servers. Then, at a step ST28, the server forms a judgment as to whether or not an address is available in some servers. If an address is available in a server, the flow of the operation goes on to a step ST29 at which the server issues a request to the server group to redistribute addresses of the pool among the servers. This is because the usage of addresses in the entire network has not been saturated yet. Finally, at the step ST25, the operation is finished. If no address is available in all the servers, on the other hand, the flow of the operation goes on from the step ST28 to the step ST25 at which the operation is finished. This is because the use of addresses in the entire network has already been saturated.

Figure 4:
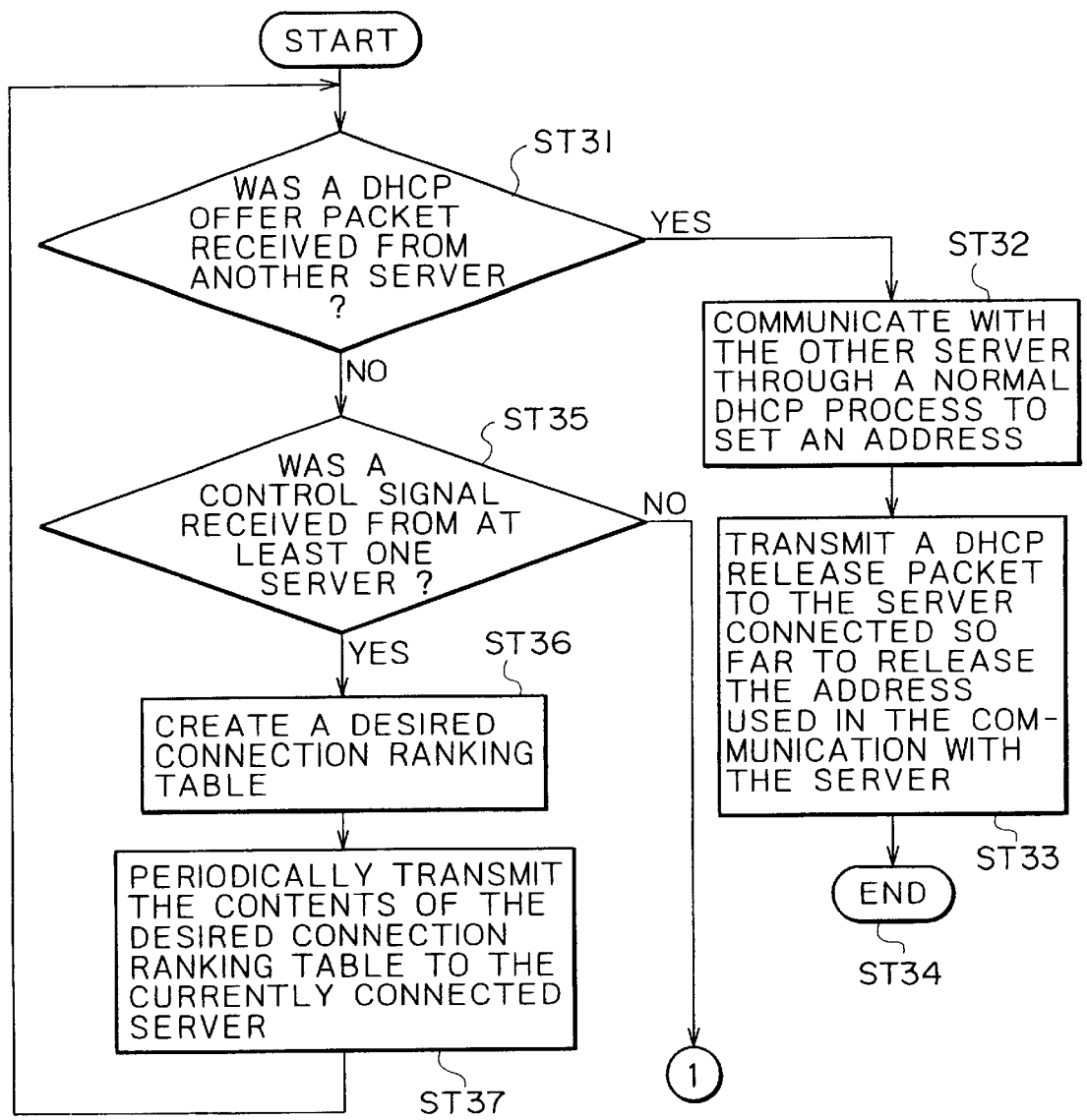
FIG. 4 is a flowchart representing the operation of an already connected client.
Figure 5:
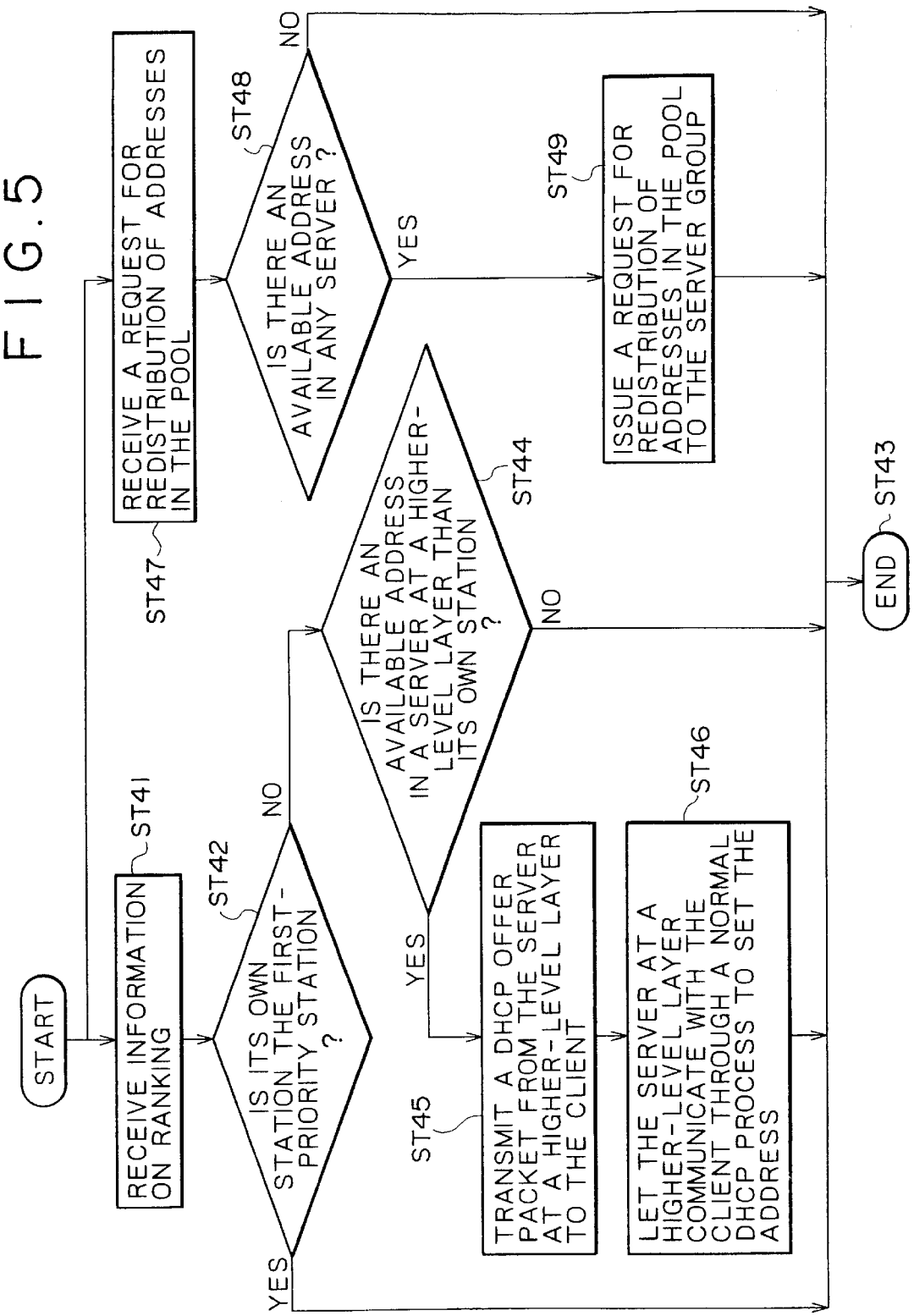
FIG. 5 is a flowchart representing the operation of a server for an already connected client.

The following description explains the operation of an already connected DHCP client (or a radio-communication terminal) and the operation of a DHCP server (or an antenna base station) for such a client with reference to flowcharts shown in FIGS. 4 and 5 respectively.

First of all, the operation (including a hand-over) of a DHCP client (or a radio-communication terminal) already connected to a server is explained. As shown in FIG. 4, the flowchart begins with a step ST31 at which the client forms a judgment as to whether or not a DHCP offer packet was received from another server. If a DHCP offer packet was received from another server, the flow of the operation goes on to a step ST32 at which a communication with this server is carried out in accordance with the ordinary DHCP process to set an address. Then, at a step ST33, the client transmits a DHCP release packet to the already connected server to release an address used so far, that is, to complete a hand-over. Finally, at a step ST34, the operation is completed.

If a DHCP offer packet was not received from another server, on the other hand, the flow of the operation goes on from the step ST31 to a step ST35 at which the client forms a judgment as to whether or not a control signal was received from at least one of the servers. If a control signal was received from at least one of the servers, the flow of the operation goes on to a step ST36 at which a desired connection ranking table is created. In this case, the client observes the reception level of the control signal received from the server to obtain a desired connection ranking based on an observed value. It should be noted, however, that a reception level not exceeding a reference value is not included in the ranking. Here, a reference value means a level under which a good quality can not be assured. Then, at a step ST37, the contents of the desired connection ranking table are transmitted periodically to the already connected server. Subsequently, the flow of the operation goes back to the step ST31.

If a control signal was not received from at least one of the servers, on the other hand, the flow of the operation goes on from the step ST35 to the step ST20 of the flowchart shown in FIG. 2.

Next, the operation of the DHCP server (or the antenna base station) for an already connected client is explained. As shown in FIG. 5, the flowchart begins with a step ST41 at which ranking information is received from a client. Then, at a step ST42, the server forms a judgment as to whether or not the station of the server itself is the first-priority station. If the station of the server itself is the first-priority station, the flow of the operation goes on to a step ST43 at which the operation is finished. If the station of the server itself is not the first-priority station, on the other hand, the flow of the operation goes on to a step ST44.

At the step ST44, the server forms a judgment as to whether or not an available address exists in a server at a level higher than this station. If an available address exists in a server at a level higher than this station, the flow of the operation goes on to a step ST45 at which the server at the higher level transmits a DHCP offer packet to the client. Then, at a step ST46, the higher-level server carries out a communication with the client in accordance with the ordinary DHCP process to set an address. Finally, at the step ST43, the operation is completed. If an available address does not exist in a server at a level higher than this station, the flow of the operation goes on to the step ST43 to complete the operation.

The flowchart may also begin with a step S47 at which a request to redistribute addresses in the pool among the servers is received from a client. Then, at a step S48, the server forms a judgment as to whether or not an address is available in some servers. If an address is available in a server, the flow of the operation goes on to a step ST49 at which the server issues a request to the server group to redistribute addresses of the pool among the servers. This is because the usage of addresses in the entire network has not been saturated yet. Finally, at the step ST43, the operation is finished. If no address is available in all the servers, on the other hand, the flow of the operation goes on from the step ST48 to the step ST43 at which the operation is finished. This is because the use of addresses in the entire network has already been saturated.

The following description explains a method to dynamically distribute addresses of the pool among the servers in response to a client's request to redistribute addresses in the pool among the servers.

In an IEEE 1394 system, the number of nodes which can be connected by wires to a bus is 63. Thus, when a wireless 1394 system is introduced, the number of nodes connectable by radio means in a bus, that is, the number of addresses usable in radio communication, is expressed by Eq. (1) as follows:

$$\text{The number of addresses usable in radio communication} = 63 - (\text{The number of nodes connected by wires}) \quad (1)$$

Thus, how to effectively assign addresses usable in radio communication to each server is most important. To cope with this problem, in this embodiment, assignment of addresses to each server is changed adaptively to dynamic mobility distribution of clients. As algorithms to change the assignment, there has been proposed two systems, namely, proposed system 1 and proposed system 2.

(a) Proposed System 1

Figure 6:
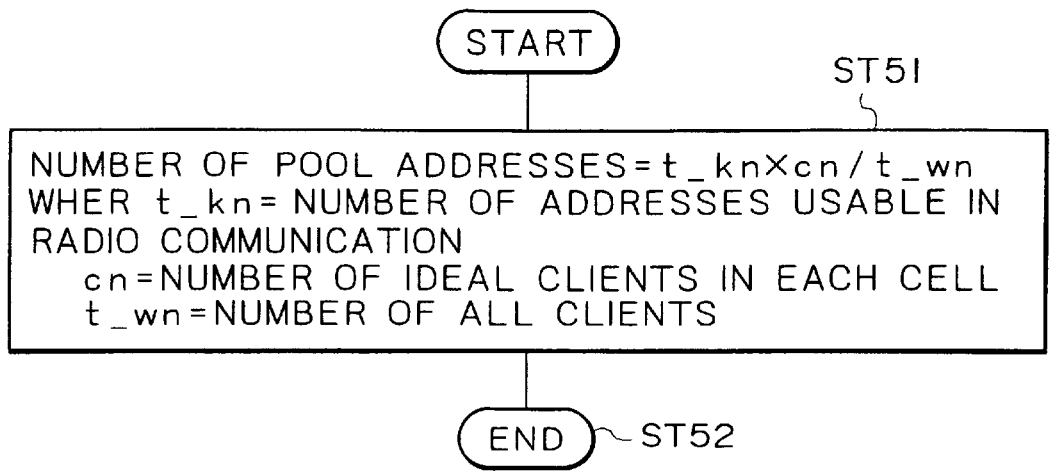
FIG. 6 is a flowchart representing an algorithm (an algorithm adopted in proposed system 1) embraced in redistribution of addresses in the pool.

The following description explains an algorithm embraced in redistribution of addresses in the pool among servers in accordance with proposed system 1 with reference to FIG. 6.

As shown in the figure, the algorithm starts with a step ST51 at which the number of new addresses is computed in accordance with Eq. (2). Then, at a step ST52, the algorithm is completed.

$$\text{Number of new addresses} = t\_kn \times cn/t\_wn \quad (2)$$

where notation $t\_kn$ is the number of addresses usable in radio communication, notation $cn$ is the number of ideal clients in each cell and notation $t\_wn$ is the number of all clients.

(b) Proposed System 2

Figure 7:
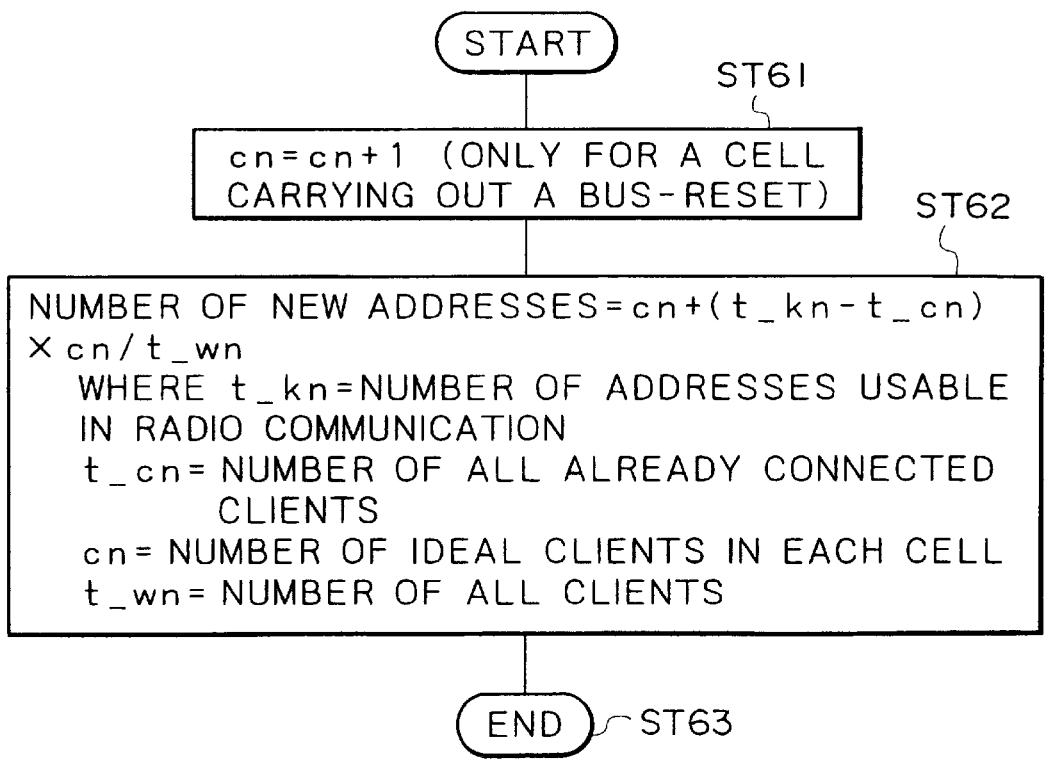
FIG. 7 is a flowchart representing an algorithm (an algorithm adopted in proposed system 2) embraced in redistribution of addresses in the pool.

The following description explains an algorithm embraced in redistribution of addresses in the pool among servers in accordance with proposed system 2 with reference to FIG. 7.

As shown in the figure, the algorithm starts with a step ST61 at which cn is incremented (cn=cn+1). This operation is carried out only for a cell carrying out a bus-reset. Then, at a step ST62, the number of new addresses is computed in accordance with Eq. (3). Finally, at a step ST63, the algorithm is completed.

$$\text{Number of new addresses} = cn + (t\_kn \cdot t\_cn) \times cn/t\_wn \quad (3)$$

where notation t_kn is the number of addresses usable in radio communication, notation t_cn is the number of all already connected clients, notation cn is the number of ideal clients in each cell and notation t_wn is the number of all clients.

By changing the assignment of addresses as described above, the number of addresses in the pool assigned to a server (cell) carrying out a bus-reset is increased reliably and an already connected client is protected. In this way, the number of clients no longer connectable due to the reassignment of addresses in the pool described above can be decreased.

Next, evaluation is explained.

First of all, objects of evaluation are described. Objects of evaluation to be described are the conventional system, a fixed system, proposed system 1 and proposed system 2.

Conventional System

The conventional system is based on the IEEE 1394 system with a wire-communication portion (in particular, the leaf portion) simply going radio.

Fixed System

Based on the DHCP, the fixed system has a fixed number of pool addresses in each server. The initial value of the number of pool addresses in each server is obtained by dividing addresses usable in the radio communication equally among servers.

Proposed System 1

Based on the DHCP, the assignment of addresses in the pool to servers is changed dynamically in accordance with the state of distribution of clients. The initial value of the number of pool addresses in each server is obtained in the same way as the fixed system. The algorithm is shown in FIG. 6.

Proposed System 2

Based on the DHCP, the assignment of addresses in the pool to servers is changed dynamically in accordance with the state of distribution of clients. The initial value of the number of pool addresses in each server is obtained in the same way as the fixed system. The algorithm is shown in FIG. 7.

Next, evaluation indicators are described. There are two evaluation indicators, namely, a deterioration ratio and the number of bus-resets. The deterioration ratio is a ratio of the number of clients uncontrolled by servers to the number of all clients as expressed by Eq. (4) below. We can say that, the smaller the deterioration ratio, the better the performance.

$$\text{Deterioration ratio} = \text{Number of clients uncontrolled by servers} / \text{Number of all clients} \quad (4)$$

The evaluation indicators, that is, the deterioration ratio and the number of bus-resets, were computed by computer simulation. FIG. 8 is a table showing parameters used in the computer simulation. In the simulation, the client activation probability is assumed to follow Poisson's distribution. In order to make the simulation close to a real model, client-deactivation cases are also taken into consideration in addition to client-activation cases. The ratio of client-activation cases to client-deactivation cases is assumed to be 2:1. By using a model having such a high ratio of client-activation cases to client-deactivation cases, the computer simulation was run to evaluate a process wherein the total number of radio-communication nodes is gradually increased from 0 to 100.

Figure 9:
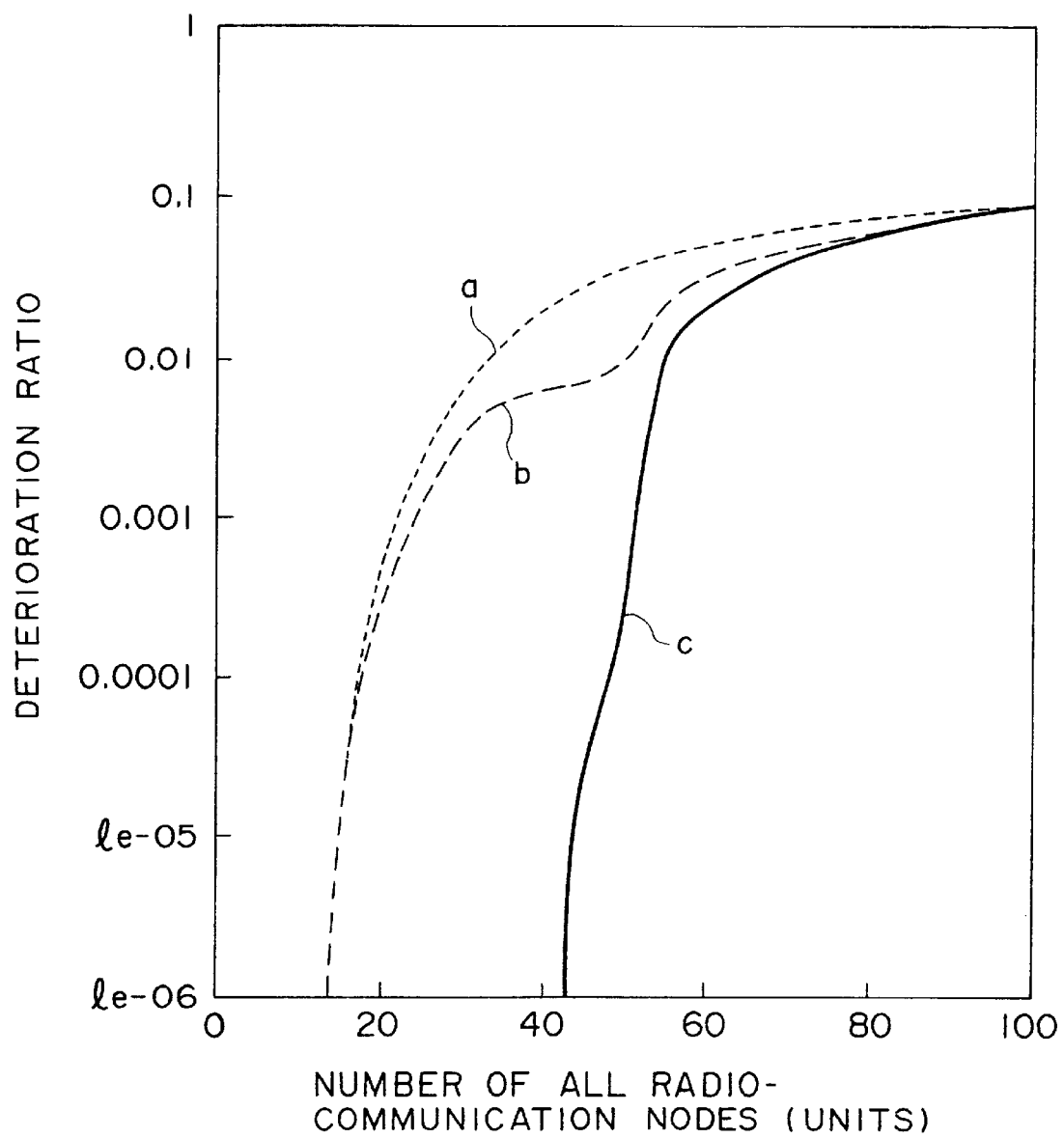
FIG. 9 is a diagram showing deterioration-ratio characteristics (each representing a relation between the number of all radio-communication nodes and the deterioration ratio) for some systems.

First of all, a deterioration-ratio characteristic is explained. FIG. 9 is a diagram showing results of simulation for the deterioration ratio. A dashed line a represents the deterioration ratio for the fixed system and a dashed line b represents the deterioration ratio for proposed system 1. A solid line c represents the deterioration ratio for the conventional system and proposed system 2. The dashed line a for the fixed system represents large values of the deterioration ratio in comparison with the solid line c for the conventional system. This is because, since the number of pool addresses in each cell is fixed in the fixed system, the fixed system is not capable of keeping up with a case in which the number of activated clients increases in a random manner.

Next, pay attention to the dashed line b for proposed system 1. Since proposed system 1 is a system to reassign addresses of the pool to servers by assuming that the client activation probability follows Poisson's distribution, it is possible to obtain smaller values of the deterioration ratio than the dashed line a for the fixed system. However, the deterioration ratio represented by the dashed line b is still greater than that represented by the solid line c for the conventional system.

Next, pay attention to the solid line c for proposed system 2. The solid line c represents an even better deterioration ratio than that of proposed system 1. In addition, proposed system 2 also provides a function to protect an already connected client and a function to reliably increase the number of pool addresses assigned to a server (cell) carrying out a bus-reset. The deterioration ratio is improved to values about equal to those for the conventional system represented by the solid line c.

Figure 10:
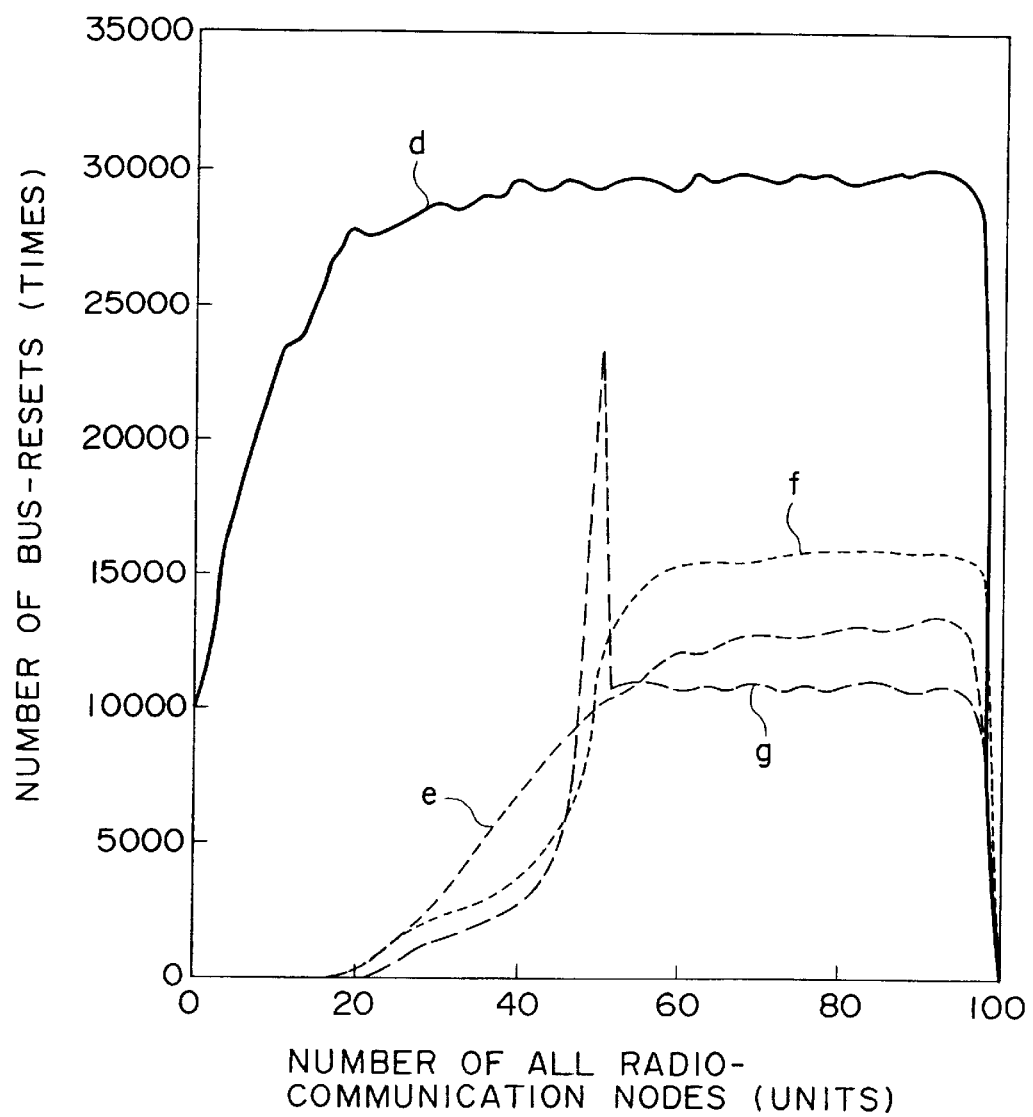
FIG. 10 is a diagram showing bus-reset characteristics (each representing a relation between the number of all radio-communication nodes and the number of bus-resets) for some systems.

Next, the number of bus-resets is explained. FIG. 10 is diagram showing results of computer simulation for the number of bus-resets. A solid line d represents a bus-reset characteristic for the conventional system and a dashed line e represents a bus-reset characteristic for the fixed system. A dashed line f represents a bus-reset characteristic for proposed system 1 and a dashed line g represents a bus-reset characteristic for proposed system 2.

In the conventional system represented by the solid line d, a bus-reset is carried out each time a connection changes. Thus, the number of bus-resets is naturally greatest. In the case of all the three other systems which are each based on the DHCP, the number of bus-resets is reduced considerably.

Particularly, in the case of proposed system 1 represented by the dashed line f and proposed system 2 represented by the dashed line g, the number of bus-resets can be sustained at a very small value for a number of all clients of up to 50. A small number of bus-resets proves that the proposed systems are effective.

In order to examine how much the number of bus-resets can be reduced in actuality, an average number of bus-resets is found for one simulation turn which is a process of gradually increasing the number of all radio-communication nodes from 0 to 100. FIG. 11A is a table showing characteristics before address saturation, that is, for a number of all radio-communication nodes in the range 0 to 52. FIG. 11B is a table showing characteristics after address saturation, that is, for a number of all radio-communication nodes in the range 53 to 100. FIG. 11C is a table showing characteristics for a number of all radio-communication nodes in the entire range 0 to 100.

The tables described above indicate that the effect before address saturation is the greatest. In the case of proposed system 2, it is obvious that the number of bus-resets is reduced to a value close to ⅕ of that of the conventional system. In addition, in the post-address-saturation range, it is obvious that the number of bus-resets is reduced to a value close to ⅓ of that of the conventional system.

In comparison with the conventional system, proposed system 2 allows the number of bus-resets to be reduced before and after the address saturation. As a whole, we can verify that the number of bus-resets can be reduced to about ⅕ of that of the conventional system.

In the embodiment described above, the present invention is applied to a wireless 1394 network. It should be noted, however, that the present invention can of course be applied to other similar networks.

According to the present invention, for example, the DHCP is introduced into a radio-communication portion of a wireless 1394 network. Reassignments of addresses accompanying a change in connection state in the radio-communication portion all conform to the DHCP, allowing the number of bus-resets in the entire network to be reduced. In addition, with the DHCP introduced, the number of pool addresses is changed in accordance with the dynamic mobility distribution of clients to reduce the number of bus-resets while sustaining the deterioration ratio at the same low level as that of the conventional system.

What is claimed is:

1. An address setting method adopted in a client-server system to assign a network address to a radio-communication terminal, wherein:
   a client executes the steps of:
      creating a priority-order assignment table of servers in accordance with a reception level of a control signal received from at least one of said servers;
      selecting a server as close to the top one of said priority-assignment table as possible as a connection server and outputting a request for a connection to said connection server;
      establishing a connection with the connection server based on the reception of said request by said connection server; and
      requesting a connectable server to increase and set the number of addresses in case a settable address of said connectable server does not exist in an address pool, and
   a server executes the steps of:
      establishing a connection with a client by setting a settable address for said client in response to said client's request for said connection for which said settable address exists in a pool of addresses; and
      issuing a request for redistribution of addresses in said pool to all servers in response to a client's request to increase and set the number of addresses to which an address available in any of said servers can be allocated.

2. An address setting method adopted in a client-server system to assign a network address to a radio-communication terminal, wherein:
   a client executes the steps of:
      creating a priority-order assignment table of servers in accordance with a reception level of a control signal received from at least one of said servers;
      periodically transmitting current contents of said priority-order assignment table to a presently connected first server; and
      establishing a new connection with a second server upon reception of a notice of establishment of said new connection from said second server and informing said first server of an end of an existing connection with said first server,
   said servers execute the steps of:
      forming a judgment as to whether or not a second server having a higher priority than a first server exists upon reception of a priority-assignment table from a client by said first server;
      setting an address for said client and establishing a connection with said client by said second server if an available address exists in said second server; and
      issuing a request for redistribution of addresses in said pool to all servers in response to a client's request to increase and set the number of addresses to which an address available in any of said servers can be allocated.

3. A client apparatus employed in a client-server system for assigning a network address to a radio-communication terminal, said client apparatus comprising:
   a table creation means for creating a priority-order assignment table of servers in accordance with a reception level of a control signal received from at least one of said servers;
   a server selection means for selecting a server as close to the top one of said priority-assignment table as possible as a connection server and outputting a request for a connection to said connection server;
   a connection establishing means for establishing a connection with the connection server based on the reception of said request by said connection server; and
   an address redistribution means for requesting a connectable server to increase and set the number of addresses in case a settable address of said connectable server does not exist in an address pool.

4. A server apparatus employed in a client-server system for assigning a network address to a radio-communication terminal, said server apparatus comprising:
   a connection establishing means for establishing a connection with a client by setting a settable address for said client in response to said client's request for said connection for which said settable address exists in a pool of addresses, said client's request for said connection being based on a priority-assignment table created by the client in accordance with a reception level of a control signal received from at least one server in the system; and
   an address redistribution means for issuing a request for redistribution of addresses in said pool to all servers in response to a client's request to increase and set the number of addresses to which an address available in any of said servers can be allocated.

5. A client apparatus employed in a client-server system for assigning a network address to a radio-communication terminal, said client apparatus comprising:
   a table creation means for creating a priority-order assignment table of servers in accordance with a reception level of a control signal received from at least one of said servers;
   a table transmission means for periodically transmitting current contents of said priority-order assignment table to a presently connected first server; and
   a connection establishing means for establishing a new connection with a second server upon reception of a notice of establishment of said new connection from said second server and informing said first server of an end of an existing connection with said first server.

6. A server apparatus employed in a client-server system for assigning a network address to a radio-communication terminal, said server apparatus comprising:

a priority judgment means for forming a judgment as to whether or not a second server having a higher priority than a first server exists upon reception of a priority-assignment table from a client by said first server, the priority-assignment table being created by the client in accordance with a reception level of a control signal received from at least one server in the system;

a connection establishing means for setting an address for said client and establishing a connection with said client by said second server if an available address exists in said second server; and an address redistribution means for issuing a request for redistribution of addresses in said pool to all servers in response to a client's request to increase and set the number of addresses to which an address available in any of said servers can be allocated.

7. A client-server system for assigning a network address to a radio-communication terminal wherein:

a client comprises:

a table creation means for creating a priority-order assignment table of servers in accordance with a reception level of a control signal received from at least one of said servers;

a server selection means for selecting a server as close to the top one of said priority-assignment table as possible as a connection server and outputting a request for a connection to said connection server;

a connection establishing means for establishing a connection with the connection server based on the reception of said request by said connection server; and an address redistribution means for requesting a connectable server to increase and set the number of addresses in case a settable address of said connectable server does not exist in an address pool, and a server comprises:

a connection establishing means for establishing a connection with a client by setting a settable address for said client in response to said client's request for said connection for which said settable address exists in a pool of addresses; and an address redistribution means for issuing a request for redistribution of addresses in said pool to all servers in response to a client's request to increase and set the number of addresses to which an address available in any of said servers can be allocated.

8. A client-server system for assigning a network address to a radio-communication terminal wherein:

a client comprises:

a table creation means for creating a priority-order assignment table of servers in accordance with a reception level of a control signal received from at least one of said servers;

a table transmission means for periodically transmitting current contents of said priority-order assignment table to a presently connected first server; and a connection establishing means for establishing a new connection with a second server upon reception of a notice of establishment of said new connection from said second server and informing said first server of an end of an existing connection with said first server; and servers each comprise:

a priority judgment means for forming a judgment as to whether or not a second server having a higher priority than a first server exists upon reception of a priority-assignment table from a client by said first server;

a connection establishing means for setting an address for said client and establishing a connection with said client by said second server if an available address exists in said second server; and an address redistribution means for issuing a request for redistribution of addresses in said pool to all servers in response to a client's request to increase and set the number of addresses to which an address available in any of said servers can be allocated.

* * * * *